(12) United States Patent
Ramachandra et al.

(10) Patent No.: US 8,483,276 B2
(45) Date of Patent: Jul. 9, 2013

(54) SYSTEM AND METHOD FOR ENCODING VIDEO WITH LUMINANCE INTENSITY VARIATIONS

(75) Inventors: Pradeepa Ramachandra, Karnataka (IN); Satish Mr, Karnataka (IN)

(73) Assignee: Aricent, Inc., Palo Alto, CA (US)

( * ) Notice: Subject to any disclaimer, the term of this patent is extended or adjusted under 35 U.S.C. 154(b) by 459 days.

(21) Appl. No.: 12/907,138

(22) Filed: Oct. 19, 2010

(65) Prior Publication Data

US 2012/0093239 A1    Apr. 19, 2012

(51) Int. Cl.
*H04N 13/02*        (2006.01)

(52) U.S. Cl.
USPC .......................... 375/240.13; 348/46

(58) Field of Classification Search
USPC ........................ 348/46; 375/240.13
See application file for complete search history.

(56) References Cited

U.S. PATENT DOCUMENTS 6,137,912 A  *  10/2000  Kostrzewski et al. ........ 382/236

* cited by examiner

*Primary Examiner* — Sath V Perungavoor
*Assistant Examiner* — Jeffery Williams
(74) *Attorney, Agent, or Firm* — John T. Whelan

(57) ABSTRACT

A video encoder is provided for use with first still image data, second still image data and third still image data. The video encoder includes a determining portion and a frame generating portion. The determining portion can output a determining signal based on the second still image data and the third still image data. The frame generating portion can output an encoded signal having first frame data, second frame data and third frame data. The first frame data is based on the first still image data. The third frame data is based on the first still image data and the third still image data when the determining signal is less than a predetermined threshold. The third frame data is not based on the first still image data when the determining signal is equal to or greater than the predetermined threshold.

12 Claims, 8 Drawing Sheets

SYSTEM AND METHOD FOR ENCODING VIDEO WITH LUMINANCE INTENSITY VARIATIONS

BACKGROUND

Conventionally, when a video camera records video, the video is recorded as a plurality of sequential still images. Each still image comprises a plurality of pixels. For example, a single high definition television image may have a matrix of 2048×1152 pixels, or over two million pixels. Each of contains data having parameters, non-limiting examples of which include color and luminance values. A color parameter may determine, for example, what amount of red, green and/or blue (RGB) is associated with a particular pixel. These RGB values may be on a scale, for example a three byte scale wherein each value may range from zero to 255 units. Similarly, the luminance value may be on a scale, for example a byte scale, wherein each value may range from zero to 255. If other parameters are used to differentiate the pixels, these parameters may also be described with a number of bits. Just taking a simple case having RGB values at three bytes for each pixel, a single high definition image would require data corresponding to 2048×1152×3×8 bits, or over 55 million bits.

A video player may play back such a video by decoding the data for each pixel, within each image. Storing or transmitting the data for each pixel, within each image consumes a large amount of processing resources. This amount of processing would be needed for each still image. To reduce the amount of processing resources required to store, transmit or decode a video comprising a plurality of still images, encoding techniques have been developed to reduce the amount of data, corresponding to original video data. This, will be described in greater detail with reference to FIG. 1.

FIG. 1 illustrates an example video system 100.

As illustrated in the figure, video system 100 includes a video recorder 102, a video encoder 104 and a transmitter 106.

Video recorder 102 is arranged to output a video signal 110. Video encoder 104 is arranged to output an encoded signal 112. Transmitter 106 is operable to transmit a transmission signal (not shown).

Video recorder 102, for example a video camera, records sequential still images. Each image is translated into large amounts of data corresponding to the parameters, e.g. color and luminance, of each pixel. The data for each image is sent to video encoder 104 as video signal 110.

Video encoder 104 transforms the formal of the data within video signal 110. Typically, video encoder 104 will compress, i.e., greatly reduce, data within video signal 110 in order to reduce the processing power and time required by transmitter 106 and by post processing equipment (not shown). There are many conventional standards for encoding video data, non-limiting examples of which include, MPEG and H.264. Conventionally, a video encoder may compress video data by transforming still image data into different amounts for data, for example a high-level encoding scheme and a low-level encoding scheme. For example, a high-level encoding may include merely passing all the data for a single still image as one encoded frame, which will be described in greater detail below with reference to FIGS. 3 and 4. Further, a low-level encoding scheme may include merely passing changes from one still image to the next still image as one encoded frame, which will also be described in greater detail below with reference to FIGS. 3 and 4. Of course there may be multiple levels of encoding. However, for ease of discussion, two levels of encoding will be discussed herein. An example conventional encoding process will be further described with reference to FIG. 2A.

FIGS. 2A-2C illustrate a person 200 speaking, at a time $t_1$, a time $t_2$ and a time $t_3$, respectively, in front of an audience 204, while being recorded by a video camera 206.

As illustrated in FIG. 2A, person 200 is speaking to audience 204. Video camera 206 corresponds to video recorder 102 of FIG. 1. The first still image recorded by video camera 206 comprises a large matrix of pixels, each of which has data corresponding to parameters such as color and luminance. Each of these parameters will have values. The values of these parameters of the pixels is the data that is sent to a video encoder (not shown in FIG. 2A), such as video encoder 104. The data corresponding to the first image is very large. A conventional video encoder may reduce the amount of data corresponding to the original still image. However, for purposes of explanation, presume that video encoder 104 generates data corresponding to all the data of the original still image. In other words, video encoder 104 encodes the first still image with high-level encoding. The data generated by video encoder 104 for each still image provided by video recorder is called an encoded frame. The encoded frame is sent downstream storage or transmission.

A conventional video encoder may generate encoded frames having a reduced amount of data as compared to the data associated with the corresponding original still images. The amount of compression is based on a proper determination of a scene change, type of video content, video encoder capability etc. In other words, if a still image changes a sufficient amount as compared to the immediately preceding still image, then the "scene" of the video is considered to be changed. A scene change may take many forms, such as movement within a video, i.e., portions of an image in a still image have a change in position as compared to their counterparts in an immediately preceding image. In these cases, if the "movement" of objects is more than a predetermined movement threshold, then the encoder may determine that the next still image should be encoded with a high-level encoding scheme. Another form of scene change may take the form of a drastic change in luminance of an image. For example, portions of an image in a still image have a change in luminance as compared to their counterparts in an immediately preceding image. In these cases, if the change is more than a predetermined luminance threshold, then the encoder may determine that the next still image should be encoded with the high-level encoding scheme. This will be described in greater detail below.

Returning to FIG. 2A, a second still image recorded by video camera 206 comprises another large matrix of pixels, each of which has data corresponding to parameters such as color and luminance. This data is also sent to video encoder 104. The data corresponding to the second image is also very large. A conventional video encoder may reduce the amount of data corresponding to the second still image by generating an encoded frame based on the difference between the first still image and the second still image. This process is called motion estimation. The motion estimation is based on the Sum of Absolute Difference (SAD) value obtained by subtracting the best-matching macroblock in the past frame from the current frame macroblock. In general, the SAD value will be relatively small for low motion sequences and relatively high in fast motion sequences. If the SAD value is relatively high, then the macroblocks are coded with a high-level encoding scheme. If the SAD value is relatively low, then the macroblocks are coded with a low-level encoding scheme.

In this example, the first still image may include person 200 and the background. The second still image will additionally include person 200 and the background. For purposes of explanation, presume in this example, person 200 is not moving very much and the lighting is not changing very much. Accordingly, the difference in the background is negligible and the difference in the image of person 200 may only lie in a slight change in the position of her mouth. Therefore, in this example, the second encoded frame corresponding to the second still image generated by video encoder 104 will only have data corresponding to the change in the pixel data corresponding to the change in position of the mouth of person 200 in the first still image and the position of the mouth of person 200 in the second still image. Therefore the amount of data within the second encoded frame is drastically smaller than the amount of data within the first encoded frame. This conventional encoding technique is repeated to generate encoded frames for each still image. Of course, if a changed between one still image and the next is too drastic, as determined by the particular video encoder, the encoder may encode drastically different still image with the high-level encoding scheme. This will be described in greater detail with additional reference to FIGS. 2B, 2C, 3 and 4.

FIG. 3 illustrates a group of still images 300 corresponding to the video of person 200 speaking in FIGS. 2A-2C.

As illustrated in FIG. 3, group of still images 300 includes a still image 302, a still image 304, a still image 306, a still image 308, a still image 310, a still image 312, a still image 314, a still image 316, a still image 318, a still image 320, a still image 322 and a still image 324.

Still image 302 corresponds to the image recorded by video camera 206 at time $t_1$ as illustrated in FIG. 2A. Still images 304, 306, 308 and 310 correspond to the images recorded by video camera 206 at sequential times between time $t_1$ and time $t_2$ as illustrated in FIG. 2B. Still image 312 corresponds to the image recorded by video camera 206 at time $t_2$ as illustrated in FIG. 2B. In this example, still image 312 is shown in a brighter shade than the remaining still images to illustrate the effects of flash 208. Still images 314, 316 and 318 correspond to the images recorded by video camera 206 at sequential times between time $t_2$ and time $t_3$ as illustrated in FIG. 2C. Still image 320 corresponds to the image recorded by video camera 206 at time $t_3$ as illustrated in FIG. 2C. Still images 322 and 324 correspond to the images recorded by video camera 206 at sequential times after time $t_3$.

In this example, presume person 200 does not move much and the lighting does not change much between time $t_1$ and time $t_2$. However at time $t_2$, as illustrated in FIG. 2B, a person in the audience (not shown) takes a flash photograph of person 200. A flash 208 from the flash photograph abruptly and drastically changes the lighting of person 200 and of the background. Further, flash 208 creates a new shadow 210 of person 200 in the background.

In this example, presume person 200 again does not move much and the lighting does not change much between time $t_2$ and time $t_3$. However at time $t_3$, as illustrated in FIG. 2C, person 200 moves from one position to another position, and then remains there.

Clearly, as seen in FIG. 3, there are many still images within group of still images 300. A discussed above, each image is comprised of a large matrix of pixels, each of which as data corresponding to parameters, such a color and luminance. All of this data would take a great deal of power and time to process and transmit. To reduce such power and time, video encoder 104 generates encoded frames for each still image. This will now be discussed in greater detail with reference to FIG. 4.

FIG. 4 illustrates a group of encoded frames 400 that have been encoded with a conventional encoding scheme and that correspond to the group of still images 300 of FIG. 3.

As illustrated in FIG. 4, group of encoded frames 400 includes an encoded frame 402, an encoded frame 404, an encoded frame 406, an encoded frame 408, an encoded frame 410, an encoded frame 412, an encoded frame 414, an encoded frame 416, an encoded frame 418, an encoded frame 420, an encoded frame 422 and an encoded frame 424.

Encoded frame 402 corresponds to still image 302, which corresponds to the image recorded by video camera 206 at time $t_1$ as illustrated in FIG. 2A. Encoded frames 404, 406, 408 and 410 correspond to still images 304, 306, 308 and 310, respectively, which correspond to the images recorded by video camera 206 at sequential times between time $t_1$ and time $t_2$ as illustrated in FIG. 2B. Encoded frame 412 corresponds to still image 312, which corresponds to the image recorded by video camera 206 at time $t_2$ as illustrated in FIG. 2B. Encoded frames 414, 416 and 418 correspond to still images 314, 316 and 318, respectively, which correspond to the images recorded by video camera 206 at sequential times between time $t_2$ and time $t_3$ as illustrated in FIG. 2C. Encoded frame 420 corresponds to still image 320, which corresponds to the image recorded by video camera 206 at time $t_3$ as illustrated in FIG. 2C. Encoded frames 422 and 424 correspond to still images 322 and 324, respectively, which correspond to the images recorded by video camera 206 at sequential times after time $t_3$.

In this example, since still image 302 is the first still image, video encoder 104 will generate encoded frame 402 with a high-level encoding scheme. The high-level encoding scheme will require a relatively high level of processing and transmitting resources down the line.

Since person 200 moves little and since the lighting changes little between times $t_1$ and $t_2$: changes between still image 302 and 304 are small. Accordingly, video encoder 104 will generate encoded frame 404 with a low-level encoding scheme. Again, the benefit of encoding includes generating much less data, i.e., encoded frame 404 that is drawn to only a difference between the data corresponding to still image 302 and the data corresponding to still image 304, as indicated by arrow 426, as opposed to all of the data corresponding to still image 304. In other words, the low-level encoding scheme will require a relatively low level of processing and transmitting resources down the line. Video encoder 104 will similarly generate encoded frames 406, 408 and 410 with a low-level encoding scheme, wherein: encoded frame 406 corresponds to a difference between still image 304 and still image 306; encoded frame 408 corresponds to a difference between still image 306 and still image 308; and encoded frame 410 corresponds to a difference between still image 308 and still image 310.

In this example, although still image 312 is drastically different from still image 310 as a result of flash 208, video encoder 104 will generate encoded frame 412 with a low-level encoding scheme. However, video encoder 104 will be triggered to encode the next still image with a high-level encoding scheme.

At this point, because video encoder 104 is triggered to encode the next still image with a high-level encoding scheme, video encoder 104 will generate encoded frame 414 with a high-level encoding scheme. Again, the high-level encoding scheme will require a relatively high level of processing and transmitting resources down the line.

Since person 200 moves little and since the lighting changes little between times $t_2$ and $t_3$: changes between still image 314 and still image 316 are small; and changes between still image 316 and still image 318 are small. Accordingly, video encoder 104 will generate encoded frame 416 and encoded frame 418 with a low-level encoding scheme. Encoded frame 416 corresponds to a difference between still image 314 and still image 316, as indicated by arrow 428. Encoded frame 418 corresponds to a difference between still image 316 and still image 318.

At this point, still image 320 is drastically different from still image 318 because person 200 had drastically moved for still image 320. Video encoder 104 will generate encoded frame 420 with a low-level encoding scheme, but following frame 422 will be encoded with High level encoding scheme. Again, the high-level encoding scheme will require a relatively high level of processing and transmitting resources down the line.

At this point, because video encoder 104 is triggered to encode the next still image with a high-level encoding scheme, video encoder 104 will generate encoded frame 422 with a high-level encoding scheme. Again, the high-level encoding scheme will require a relatively high level of processing and transmitting resources down the line.

Finally, person 200 moves little and since the lighting changes little after time $t_3$: changes between still image 322 and still image 324 are small. Accordingly, video encoder 104 will generate encoded frame 424 with a low-level encoding scheme, wherein encoded frame 424 corresponds to a difference between still image 322 and still image 324.

In the example discussed above with reference to FIGS. 2A-2C, group of encoded frames 400 include three frames, encoded frames 402, 414 and 422, that were encoded with a high-level encoding scheme. Each of these frames increases the required processing power and bandwidth requirement for transmission. It is a goal to reduce this amount of processing power and time. A conventional method to avoid number of high-level encoded frames will now be described with reference to FIG. 5.

FIG. 5 illustrates another group of encoded frames 500 that have been encoded with a conventional encoding scheme and that correspond to the group of still images of FIG. 3.

As illustrated in FIG. 5, group of encoded frames 500 includes encoded frame 402, encoded frame 404, encoded frame 406, encoded frame 408, encoded frame 410, encoded frame 412, an encoded frame 502, encoded frame 416, encoded frame 418, encoded frame 420, encoded frame 422 and encoded frame 424.

Group of encoded frames 500 of FIG. 5 differs from group of encoded frames 400 of FIG. 4, in that encoded frame 414 of group of encoded frames 400 is replaced with encoded frame 502. The conventional video encoder always uses a plurality of previous still images (a.k.a. number of reference frames, set by encoder configuration) to generate the next encoded frame. As shown in FIG. 5, to encode frame 502, encoder will do multiple motion estimation with previous still image data. In this example, the encoder generates encoded frame 502 based on a difference between still, image 312 and still image 314, as indicated by arrow 504; a difference between still image 310 and still image 314, as indicated by arrow 508; and a difference between still image 308 and still image 314, as indicated by arrow 506. This scheme will increase required processing power and memory space to encode each frame. But mobile platform video encoders cannot afford for having huge number of multiple reference frames because of lack of processing power and memory allocated to encode each still image in realtime.

In the conventional encoding scheme illustrated in FIG. 5, a video encoder will generate encoded frame 502 with a modified low-level encoding scheme. Performing the modified low-level encoding scheme per frame require a lower level of processing for the encoder as compared to the high-level encoding scheme per frame. However in conventional encoders, the modified low-level encoding scheme will require a higher level of processing as compared to the low-level encoding scheme.

Motion estimation using only one frame, for example as discussed above with reference to FIG. 4, requires nearly 35-40% of the total encoding time. Having more reference frames to perform motion estimation, for example as discussed above with reference to FIG. 5, requires more time and processing resources to determine the best match for the current macro block. H.264 encoding standard uses multiple reference frames, such as described with reference to FIG. 5. If provided with more processing power, encoders may opt for using multiple reference frames. Hence, although there is a provision for multiple reference frames, most mobile platform H.264 video encoders will use only one reference frame for motion estimation algorithm in order to reduce the complexity, amount of required power and the memory space.

What is needed is a system and method for efficiently encoding video data having abrupt illumination variations.

BRIEF SUMMARY

The present invention provides a system and method for efficiently encoding video data having illumination variations.

In accordance with an aspect of the present invention, A video encoder is provided for use with first still image data, second still image data and third still image data. The video encoder includes a determining portion and a frame generating portion. The determining portion can output a determining signal based on the second still image data and the third still image data. The frame generating portion can output an encoded signal having first frame data, second frame data and third frame data. The first frame data is based on the first still image data. The third frame data is based on the first still image data and the third still image data when the determining signal is less than a predetermined threshold. The third frame data is not based on the first still image data when the determining signal is equal to or greater than the predetermined threshold.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
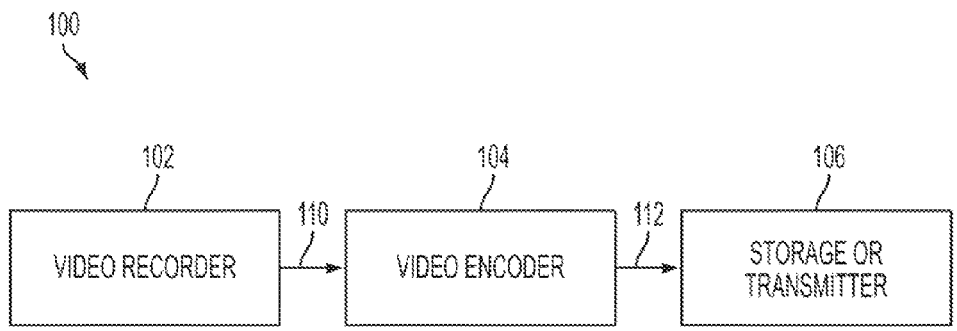
FIG. 1 illustrates an example video system.

An aspect of the present invention is drawn to an encoder and method of encoding video data, wherein a false scene change detection is avoided when a drastic illumination change occurs between a current still image and an immediately preceding still image. By avoiding a false scene change detection in this situation, an encoder is not triggered to encode a following frame with a high-level encoding scheme. On the contrary, when a drastic illumination change occurs, an encoder is triggered to encode a following frame with a modified low-level encoding scheme, where the following still image is encoded based on a difference between the following still image and the preceding still image, i.e., the current still image is ignored.

An aspect of the present invention is drawn to an encoder and method of encoding video data, wherein when encoding a video having a plurality of still images, a frame is generated for each still image, and wherein one of a plurality of different encoding schemes are used. In an example embodiment, a high-level encoding scheme is used for scene changes and a low-level encoding scheme is used for non-scene changes. A system and method of encoding in accordance with aspects of the present invention are particularly suited for "Constant Bit rate" video encoding.

A scene changes is a situation where a value of a predetermined parameter of one still image changes more than a predetermined threshold amount as compared to a value of the same predetermined parameter of the immediately preceding image. For example, a scene change may be determined by detecting motion, i.e., a change is position of a portion of a still image as compared to the position of that portion in the immediately preceding still image. This type of scene change determination will therefore exclude drastic changes in luminance, for example as a result of a flash.

Returning to FIGS. 2B and 3, the position of person 200 within still image 310 changes little as compared to the position of person 200 within still image 312 (corresponding to FIG. 2B). As such, an encoding in accordance with aspects of the present invention would be able to encode an encoded frame corresponding to still frame 312 with a low-level encoding scheme, even though there is a drastic change in luminance within still frame 312 as a result of flash 208.

Another aspect of the present invention is drawn to an encoder and method of encoding video data, wherein when encoding a video having a plurality of still images, a frame is generated for each still image, wherein one of a plurality of different low-level encoding schemes are used. In an example embodiment, a first low-level encoding scheme is used when there is no drastic change in luminance from one still image as compared with the immediately preceding still image and a second low-level encoding scheme is used when there is a drastic change in luminance from one still image as compared with the immediately preceding still image.

In the first low-level encoding scheme, an encoded frame is generated based on a current frame and the immediately preceding frame. Returning to FIG. 3, the luminance within still image 310 changes little as compared to the luminance within still image 308. As such, an encoding in accordance with aspects of the present invention would be able to encode an encoded frame corresponding to still image 310 based on a difference between still image 308 and still image 310.

Figure 2A:
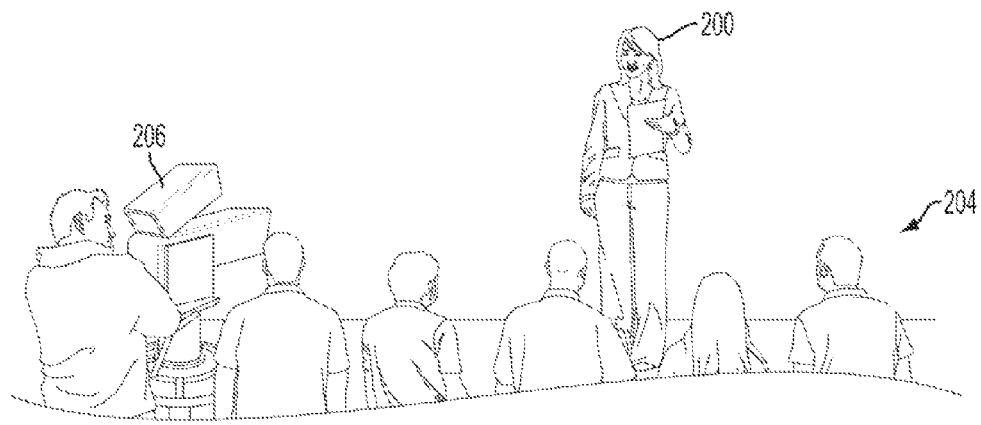
FIGS. 2A-2C illustrate a person speaking, at three consecutive times, in front of an audience, while being recorded by a video camera.

In the second low-level encoding scheme, an encoded frame is generated based on a current frame and the second preceding frame. Returning to FIGS. 2A and 3, the luminance within still image 314 is a drastic change as compared to the luminance within still image 312. As such, an encoding in accordance with aspects of the present invention would be able to encode an encoded frame corresponding to still image 314 based on a difference between still image 314 and still image 310.

Another aspect of the present invention is drawn to an encoder and method of encoding video data, wherein a scene change is determined based on a macro block-comparison between two adjacent still images. For example, in order to determine whether a still image in a first frame differs sufficiently from the still image of a second frame, only derived parameter from each still image is compared. Accordingly, the processing time and power for determining whether to encode the second still image with a high-level encoding scheme or with a low-level encoding scheme is decreased.

Aspects of the invention will now be described with reference to FIGS. 6-13B.

Figure 3:
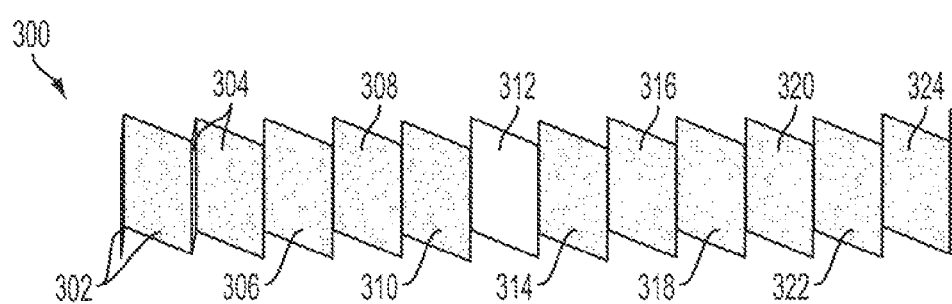
FIG. 3 illustrates a group of still images corresponding to the video of the person speaking in FIGS. 2A-2C.
Figure 6:
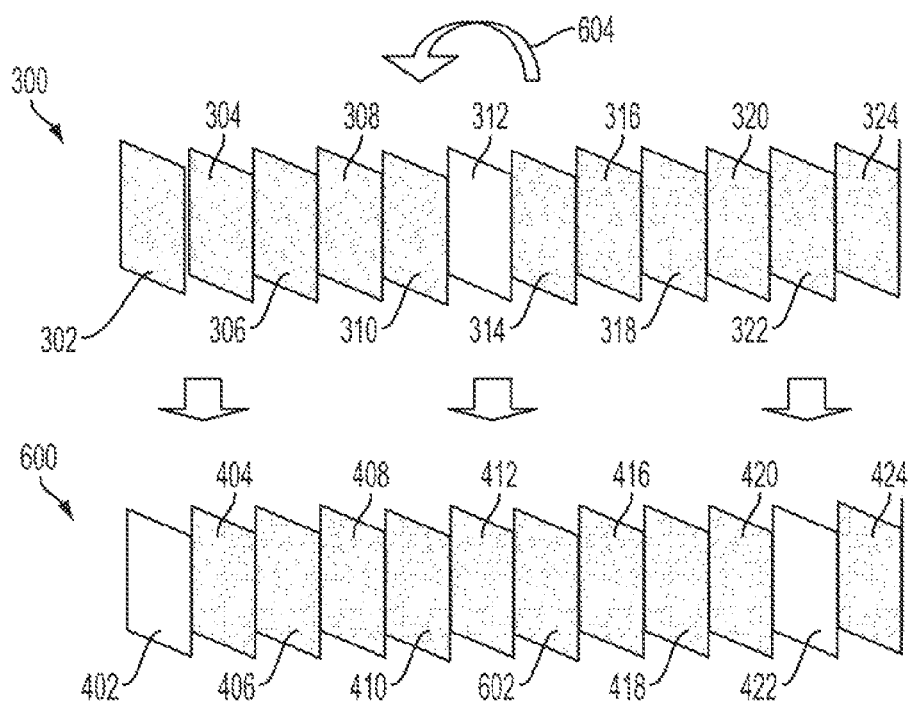
FIG. 6 illustrates a group of encoded frames that have been encoded in accordance with an aspect of the present invention and that correspond to the group of still images of FIG. 3.

FIG. 6 illustrates a group of encoded frames 600 that have been encoded in accordance with an aspect of the present invention and that correspond to the group of still images of FIG. 3.

As illustrated in FIG. 6, group of encoded frames 600 includes encoded frame 402, encoded frame 404, encoded frame 406, encoded frame 408, encoded frame 410, encoded frame 412, an encoded frame 602, encoded frame 416, encoded frame 418, encoded frame 420, encoded frame 422 and encoded frame 424.

Figure 5:
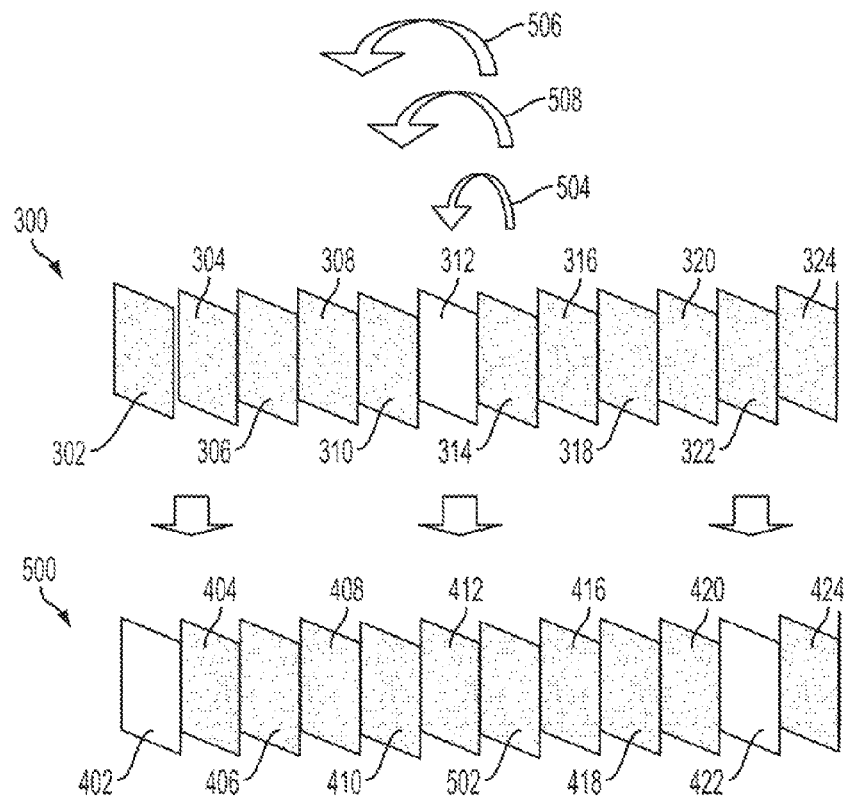
FIG. 5 illustrates another group of encoded frames that have been encoded with a conventional encoding scheme and that correspond to the group of still images of FIG. 3.

Group of encoded frames 600 differs from group of encoded frames 500 of FIG. 5, in that encoded frame 502 of group of encoded frames 500 is replaced with encoded frame 602. In accordance with aspects of the present invention, when a video encoder determines that the luminance has drastically changed from one still image to another still image, it uses a single, second previous still image to generate the next encoded frame. For example, returning to FIGS. 2B and 3, the effects of flash 208 are evident in still image 312. Corresponding encoded frame 412 is generated using a high-level encoding scheme. Then the effects of flash 208 are no longer evident in still image 314. An encoder in accordance with aspects of the present invention may recognize that the drastic change in luminance only lasts for a single still image, i.e., still image 312. To avoid encoding the next encoded frame (after encoded frame 412) with a high-level encoding scheme, an encoder in accordance with aspects of the present invention may generate the next encoded frame with a low-level encoding scheme. This modified low-level encoding scheme may include using the difference between a single second preceding still image and current still image 314. In this example, the encoder generates encoded frame 602 based on: a difference between still image 310 and still image 314, as indicated by arrow 604.

In an encoding scheme in accordance with aspects of the present invention as illustrated in FIG. 6, a video encoder will generate encoded frame 602 with a low-level encoding scheme. The low-level encoding scheme requires a lower level of processing for an encoder as compared to modified low-level encoding scheme as discussed above with reference to FIG. 5.

In accordance with aspects of the present invention, a determination of performing high-level encoding or performing low-level encoding may be based on one of luminance change and movement between still images. This will be described in greater detail with reference to FIGS. 7A-7C.

Figure 7A:
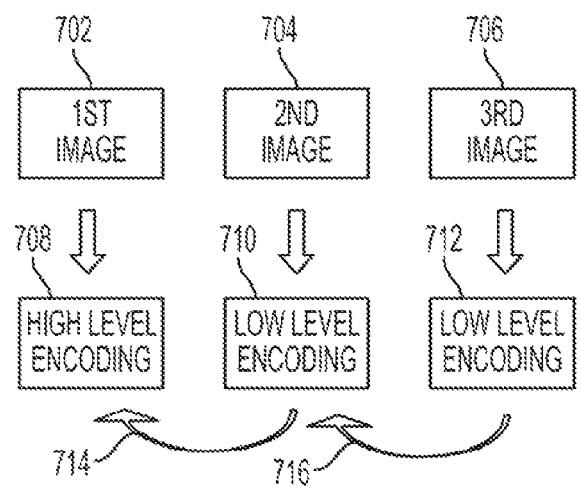
FIGS. 7A-7C illustrate situations for a high-level encoding scheme and a low level encoding scheme in accordance with aspects of the present invention.
Figure 7B:
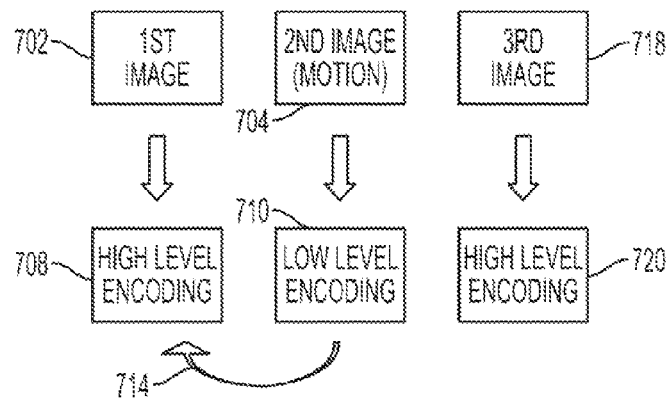
Figure 7C:
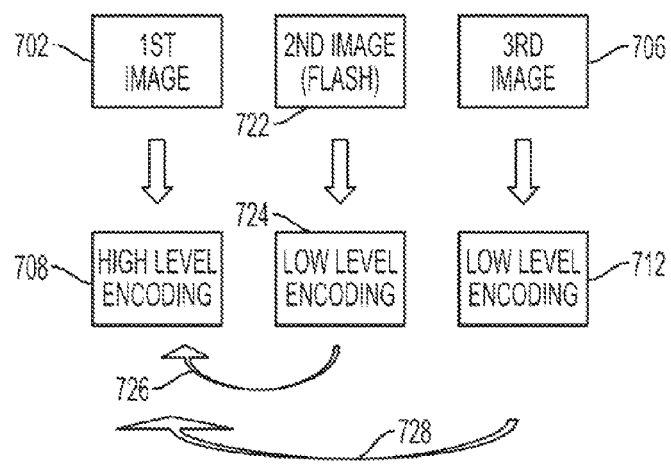

FIGS. 7A-7C illustrate example situations for a high-level encoding scheme and a low-level encoding scheme in accordance with aspects of the present invention.

In the example situation of FIG. 7A, there is little motion between images and little changes in luminance. FIG. 7A includes a first still image 702, a second still image 704 and a third still image 706, each provided by a video recorder (not shown). First still image 702 will be encoded as an encoded frame 708 with a high-level encoding scheme, wherein encoded frame 708 is based on all the pixel data of first still image 702. Second still image 704 will be encoded as an encoded frame 710 with a low-level encoding scheme, wherein encoded frame 710 is based on a difference between still image 702 and still image 704 as indicated by arrow 714. Third still image 706 will be encoded as an encoded frame 712 with a low-level encoding scheme, wherein encoded frame 712 is based on a difference between second still image 704 and third still image 706 as indicated by arrow 716.

In the situation discussed with reference to FIG. 7A, the encoder encodes one encoded frame with a high-level encoding scheme and encodes two encoded frames with a low-level encoding scheme.

In the example situation of FIG. 7B, there is substantial motion between a first still image and second still image, but there are little changes in luminance in any of the still images. FIG. 7B includes first still image 702, second still image 704 and a third still image 718, each provided by a video recorder (not shown). First still image 702 will be encoded as encoded frame 708 with a high-level encoding scheme. Second still image 704 will be encoded as encoded frame 710. However, as noted above, there is a substantial change between second still image 704 and first still image 702 as a result of movement. Accordingly, third still image 718 will be encoded as an encoded frame 720 with a high-level encoding scheme, wherein encoded frame 720 is based only on all the pixel data of third still image 718.

In the situation discussed with reference to FIG. 7B, the encoder encodes two frames with a high-level encoding scheme and one frame with a low-level encoding scheme.

In the example situation of FIG. 7C, there is substantial increase in luminance, for example as a result of a flash, in a second still image, but there are little changes in motion between any of the still images. FIG. 7C includes a first still image 702, a second still image 722 and third still image 706, each provided by a video recorder (not shown). First still image 702 will be encoded as encoded frame 708 with a high-level encoding scheme. Second still image 722 will be encoded as an encoded frame 724 with a low-level encoding scheme, wherein encoded frame 724 is based on the difference between the pixel data of second still image 722 and the pixel data of first still image 702 as indicated by arrow 726. Third still image 706 will be encoded as an encoded frame 712 with a low-level encoding scheme, wherein encoded frame 712 is based on a difference between first still image 702 and third still image 706 as indicated by arrow 728.

In the situation discussed with reference to FIG. 7C, the encoder encodes two frames with a low-level encoding scheme and one frame with a high-level encoding scheme.

Figure 8:
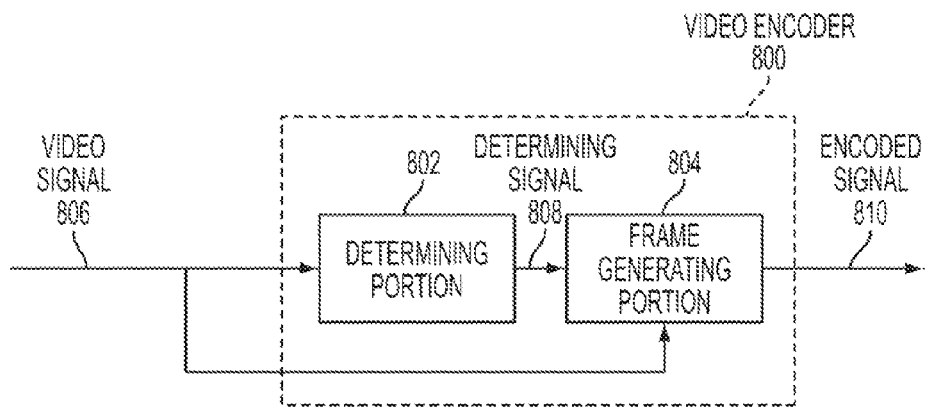
FIG. 8 illustrates an example video encoder in accordance with aspects of the present invention.
Figure 9:
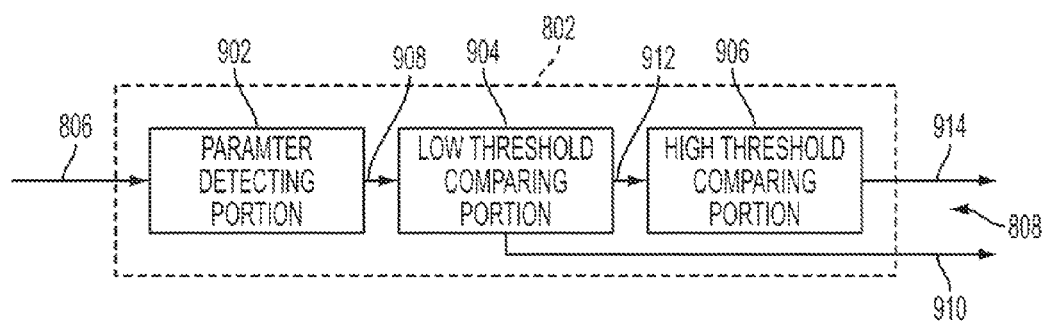
FIG. 9 illustrates an example determining portion of FIG. 8 in accordance with aspects of the present invention.

A more detailed discussion of an example video encoder in accordance with aspects of the present invention will now be provided with reference to FIGS. 8 and 9.

FIG. 8 illustrates an example video encoder 800 in accordance with aspects of the present invention.

As illustrated in the figure, video encoder 800 includes a determining portion 802 and a frame generating portion 804. Each of determining portion 802 and frame generating portion 804 are illustrated as individual devices. However, in some embodiments, determining portion 802 and frame generating portion 804 may be combined as a unitary device. Further, in some embodiments, at least one of determining portion 802 and frame generating portion 804 may be implemented as computer-readable media for carrying or having computer-executable instructions or data structures stored thereon. Such computer-readable media can be any available media that can be accessed by a general purpose or special purpose computer. Non-limiting examples of computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Determining portion 802 is operable to output a determining signal 808 based on a video signal 806. Frame generating portion 804 is operable to output an encoded signal 810 based on video signal 806.

Determining portion 802 may determine a drastic change in one still image as compared to the immediately preceding still image. Further determining portion 802 may determine the drastic change, irrespective of whether the drastic change is a result of a luminance change. Accordingly, determining portion 802 avoids false scene change detection.

Frame generating portion 804 is operable to generate an encoded frame corresponding to a still image provided by video signal 806. In an example embodiment, frame generating portion 804 can generate an encoded frame using a high-level encoding scheme, a first low-level encoding scheme and a second low-level encoding scheme. The high-level encoding scheme takes the largest amount of processing resources. The first and second low-level encoding schemes require less processing resources than that of the high-level encoding scheme.

When generating an encoded frame using a high-level encoding scheme, frame generating portion 804 may generate the encoded frame using the data from a current still image. For example, returning to FIG. 6, frame generating portion 804 may generate encoded frame 422 using the data from still image 322.

When generating an encoded frame using the first low-level encoding scheme, frame generating portion 804 may generate the encoded frame using the data from a current still image and an immediately preceding still image. For example, returning to FIG. 6, frame generating portion 804 may generate encoded frame 406 using the data from still image 306 and still image 304.

When generating an encoded frame using the second low-level encoding scheme, frame generating portion 804 may generate the encoded frame using the data from a current still image and second preceding still image. For example, returning to FIG. 6, frame generating portion 804 may generate encoded frame 602 using the data from still image 314 and still image 310.

A more detailed discussion of determining portion 802 will now be described with reference to FIG. 9.

FIG. 9 illustrates an example determining portion 802 of FIG. 8 in accordance with aspects of the present invention.

As illustrated in the figure, determining portion 802 includes a parameter detecting portion 902, a low threshold comparing portion 904 and a high threshold comparing portion 906. All of parameter detecting portion 902, low threshold comparing portion 904 and high threshold comparing portion 906 are illustrated as individual devices. However, in some embodiments, at least two of parameter detecting portion 902, low threshold comparing portion 904 and high threshold comparing portion 906 may be combined as a unitary device. Further, in some embodiments, at least one of parameter detecting portion 902, low threshold comparing portion 904 and high threshold comparing portion 906 may be implemented as computer-readable media for carrying or having computer-executable instructions or data structures stored thereon.

Parameter detecting portion 902 is operable to output a detected parameter value 908 based on video signal 806. Low threshold comparing portion 904 is operable to output a low threshold comparison value 910 based on detected parameter value 908 or to output a detected parameter value 912. High threshold comparing portion 906 is operable to output a high threshold comparison value 914 based detected parameter value 912.

As data is generated by a video recorder (not shown) for each still image, this still image data is provided to parameter detecting portion 902 as video signal 806. The data corresponding to each still image, that is the data corresponding to all of the pixels that make up the still image, will have an overall parameter value P. As such, a first still image may have an overall parameter value $P_1$, whereas a second still image may have an overall parameter value $P_2$. The parameter may be any parameter that can distinguish one image from another, non-limiting examples of which include color and luminance of portions of pixels associated with an image.

Parameter detecting portion 902 then generates $\Delta P$, as detected parameter value 908, which is the absolute difference between the overall parameter value of a current still image $P_1$ and the overall parameter value of an immediately preceding still image $P_2$, i.e., $\Delta P = |P_1 - P_2|$. For example, if the difference between overall parameter values of two adjacent still images is large, then $\Delta P$, detected parameter value 908, will be large. Likewise, if the difference between overall parameter values of two adjacent still images is small, then $\Delta P$, detected parameter value 908, will be small.

In some embodiments of the present invention, data corresponding to a portion of each still image, that is the data corresponding to all of the pixels that make up a portion of the still image, will have an overall portion parameter value $P_p$. As such, a portion of first still image may have an overall portion parameter value $P_{p1}$, whereas a portion of second still image may have an overall portion parameter value $P_{p2}$. Parameter detecting portion 902 then generates detected parameter value 908 as $\Delta P_{p1}$ or $\Delta P_{p2}$. By using only a portion of each still image, the processing power and time may be reduced. This will be described in greater detail below with reference to FIGS. 12A and 12B.

Low threshold comparing portion 904 compares detected parameter value 908 with a predetermined low threshold $P_{TL}$. If detected parameter value 908 is less than predetermined low threshold $P_{TL}$, then low threshold comparing portion will output low threshold comparison value 910. If detected parameter value 908 is greater than or equal to predetermined low threshold $P_{TL}$, then low threshold comparing portion 904 will pass detected parameter value 908 as detected parameter value 912. In other words, if $|P_1 - P_2| < P_{TL}$, then the difference between the current still image and the immediately preceding still image is relatively small, and low threshold comparing portion will output low threshold comparison value 910. On the other hand, if $|P_1 - P_2| \geq P_{TL}$, then the difference between the current still image and the immediately preceding still image is not relatively small, and low threshold comparing portion will pass detected parameter value 908 as detected parameter value 912. In an example embodiment, low threshold comparison value 910 is a single binary bit, wherein if detected parameter value 908 is greater than or equal to the predetermined low threshold, i.e., if $|P_1 - P_2| \geq P_{TL}$, then low threshold comparison value 910 may be a 0 and detected parameter value 908 is passed as detected parameter value 912, whereas if detected parameter value 908 is less than the predetermined low threshold, i.e., if $|P_1 - P_2| < P_{TL}$, then low threshold comparison value 910 may be a 1.

High threshold comparing portion 906 compares detected parameter value 912 with a predetermined high threshold $P_{TH}$ to generate high threshold comparison value 914. In an example embodiment, high threshold comparison value 914 is a single binary bit, wherein if detected parameter value 912 is greater than or equal to the predetermined high threshold, i.e., if $|P_1 - P_2| \geq P_{TH}$, then high threshold comparison value 914 may be a 1, whereas if detected parameter value 912 is less than the predetermined high threshold, i.e., if $|P_1 - P_2| < P_{TH}$, then high threshold comparison value 914 may be a 0.

As illustrated in the figure, high threshold comparison value 914 and low threshold comparison value 910 make up determining signal 808.

Returning to FIG. 8, frame generating portion 804 is operable to generate an encoded frame for a following still image based on the detected parameter value 908. In an example embodiment, frame generating portion 804 may encode the following still image with a first low-level encoding scheme, a second low-level encoding scheme or a high-level encoding scheme. The first low-level encoding scheme is based on a comparison between the current still image and the immediately preceding still image, and requires a relatively small amount of processing resources. The second low-level encoding scheme is based on a comparison between the current still image and the second preceding still image, and requires a similar amount of processing resources as compared to the first low-level encoding scheme. The high-level encoding scheme is based on the current still image, and requires a relatively large amount of processing resources.

Frame generating portion 804 may encode a following still image with the first low-level encoding scheme based on low threshold comparison value 910. For example, if low threshold comparison value 910 is a 1, in other words, when $|P_1 -$ $P_2|<P_{TL}$, then frame generating portion 804 will generate an encoded the following frame using a first low-level encoding scheme. In other words, when $|P_1-P_2|<P_{TL}$, frame generating portion 804 will be triggered to generate the following encoded frame using the data from the following still image and data from a current still image. For example, returning to FIG. 6, the difference between still image 306 and still image 304 is not too drastic, i.e, a difference in the absolute value of a detected parameter of each still image is less than the predetermined high threshold, to be considered a scene change. Further, the difference between still image 306 and still image 304 is insufficient, i.e, the difference in the absolute value of the detected parameter of each still image is less than the predetermined low threshold, to be considered a luminance change. As such, frame generating portion 804 will be triggered to generate the following encoded frame, encoded frame 408, using the data from still image 308 and the data from still image 306.

Accordingly, if the difference between a current still image and the immediately preceding still image is insufficient, frame generating portion 804 may be triggered to encode the following still image with the first low-level encoding scheme without a need for high threshold comparing portion 906 to generate high threshold comparison value 914.

Frame generating portion 804 may encode a following still image with the high-level encoding scheme based on detected parameter value 912. For example, if low threshold comparison value 910 is a 0, in other words, when $|P_1-P_2|\geq P_{TL}$, then low threshold comparing portion 904 will pass detected parameter value 908 as detected parameter value 912. Then, if high threshold comparison value 914 is a 1, in other words, when $|P_1-P_2|\geq P_{TH}$, then frame generating portion 804 will generate an encoded frame using the high-level encoding scheme. In other words, when $|P_1-P_2|\geq P_{TH}$, frame generating portion 804 will be triggered to generate the following encoded frame using the data from the following still image. For example, returning to FIG. 6, the difference between still image 320 and still image 318 is so drastic, i.e, a difference in the absolute value of a detected parameter of each still image is greater than or equal to the predetermined high threshold, it is considered a scene change. As such, frame generating portion 804 may be triggered to generate the following encoded frame, encoded frame 422, using the data from still image 322.

Accordingly, if the difference between a current still image and the immediately preceding still image is greater than the predetermined high threshold (and which is necessarily therefore greater than the predetermined low threshold), frame generating portion 804 may be triggered to encode the following still image with the high-level encoding scheme.

Frame generating portion 804 may encode a following still image with the second low-level encoding scheme based on detected parameter value 912. For example, if low threshold comparison value 910 is a 0, in other words, when $|P_1-P_2|\geq P_{TL}$, then low threshold comparing portion 904 will pass detected parameter value 908 as detected parameter value 912. Then, if high threshold comparison value 914 is a 0, in other words, when $|P_1-P_2|<P_{TH}$, then frame generating portion 804 will generate an encoded frame using the second low-level encoding scheme. In other words, when $P_{TL}\leq|P_1-P_2|<P_{TH}$, frame generating portion 804 will be triggered to generate the following encoded frame using the data from the following still image and the preceding still image. For example, returning to FIG. 6, when the difference between still image 312 and still image 310 is greater than the predetermined low threshold but is less than the predetermined high threshold, it is considered an illumination variation. As such, frame generating portion 804 may be triggered to generate encoded frame 602 using the data from still image 314 and the data from still image 310.

Accordingly, if the difference between a current still image and the immediately preceding still image is greater than or equal to the predetermined low threshold, but is less than the predetermined high threshold, frame generating portion 804 may be triggered to encode the following still image with the second low-level encoding scheme.

Figure 10:
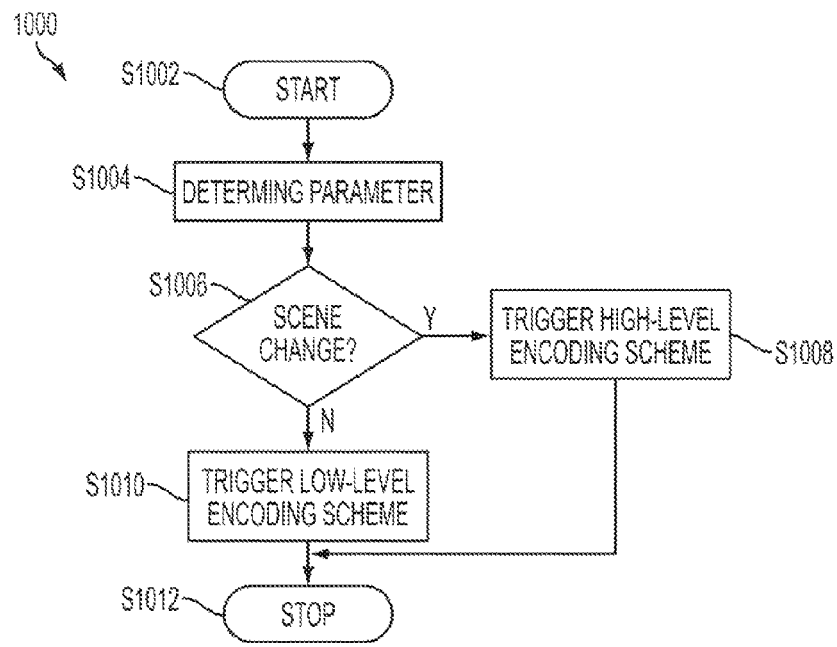
FIG. 10 illustrates a general method of encoding video data in accordance with aspects of the present invention.

A general example of the operation of a video encoding system in accordance with the present invention will now be describe with reference to FIG. 10.

FIG. 10 illustrates a general method 1000 of encoding video data in accordance with aspects of the present invention:

As illustrated in the figure, method 1000 starts (S1002) and then a parameter of the still image is determined (S1004). For example, returning to FIG. 2C, speaker 200 has moved. Accordingly, as seen in FIG. 6, still image 320 corresponds to the image of speaker 200 in FIG. 2C.

Returning to FIG. 10, it is then determined whether there is a scene change (S1006). For example, if one still image is drastically different from the immediately preceding still image, it may be because of a scene change. A scene change may be the result of a movement within the video. For example, returning to FIG. 6, still image 320 is drastically different from still image 318.

If it is determined that there is a scene change, then the encoder is triggered to encode the next still image with a high-level encoding scheme (S1008) and method 1000 stops (S1012). For example, as illustrated in FIG. 6, still image 320 is drastically different from still image 318. Therefore, encoded frame 422 is encoded with a high-level encoding scheme. In particular, while encoding encoded frame 420, the encoder will understand that a scene change occurred. Therefore the very next frame will be encoded with the high-level encoding scheme.

If it is determined that there is no scene change, then the encoder is triggered to encode the next still image with a low-level encoding scheme (S1010) and method 1000 stops (S1012). For example, as illustrated in FIG. 6, still image 308 is not drastically different from still image 306. Therefore, encoded frame 410 is encoded with a low-level encoding scheme. In particular, while encoding encoded frame 408, the encoder will understand that a scene change not occurred. Therefore the very next frame will be encoded with the low-level encoding scheme.

Figure 11:
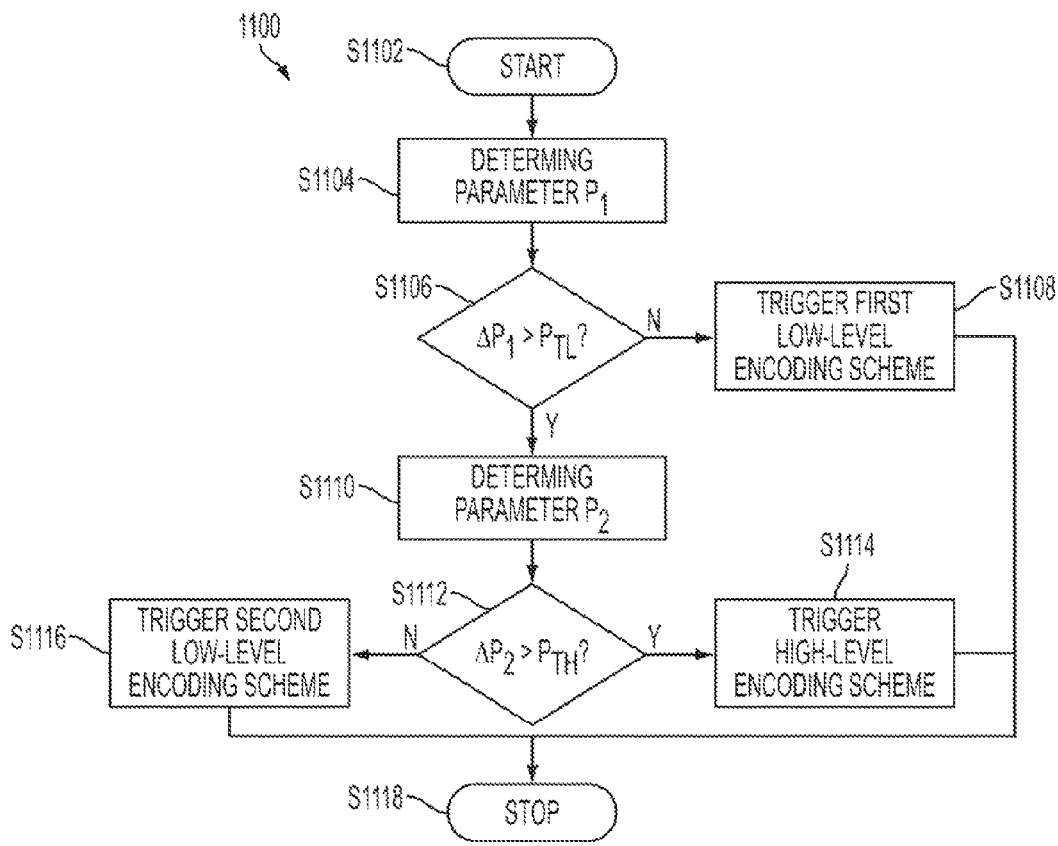
FIG. 11 illustrates a more detailed portion of the method of FIG. 10.

FIG. 11 illustrates a more detailed example method 1100 of encoding video data in accordance with aspects of the present invention.

As illustrated in the figure detailed method 1100 starts (S1102), and a first parameter is determined (S1104). In an example embodiment a value $P_1$, which is a SAD—a sum of the absolute difference between an entire current still image and an entire immediately previous still image, is determined. In some embodiments, only a portion of one still image is compared with a portion of the immediately preceding still image.

A more detailed description of an example first parameter determination using macro blocks of a still image in accordance with aspects of the present invention will now be describe with reference to FIG. 12.

Figure 12A:
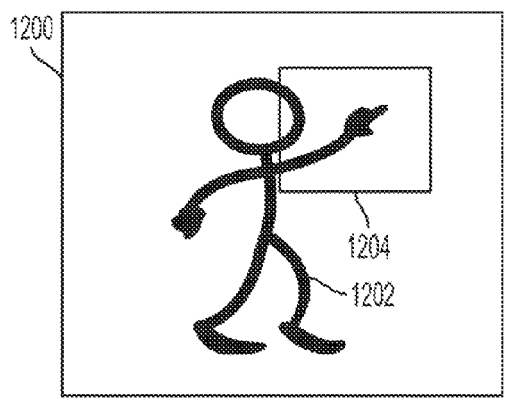
FIGS. 12A-12B illustrate still images corresponding to a person a first time and a second time, respectively.
Figure 12B:
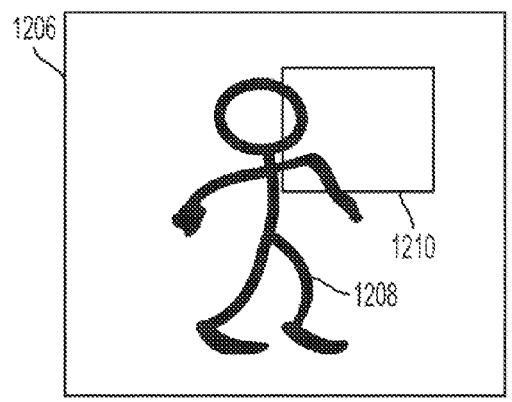

FIGS. 12A-12B illustrate two consecutive still images within a video, corresponding to a person at a first time and a second time, respectively.

As illustrated in FIG. 12A, a still image 1200 includes an image 1202 of a person. Still image 1200 may comprise a plurality of macro blocks, one of which is shown as item 1204.

As illustrated in FIG. 12B, a still image 1206 includes an image 1208 of the person. Still image 1208 additionally comprises a plurality of macro blocks, one of which is shown as item 1210, which corresponds to macro block 1204 of FIG. 12A. Still image 1200 precedes still image 1206 with a video.

In accordance with an aspect of the present invention, an encoder may compare only a portion of one still image with the corresponding portion of the immediately preceding still image. Accordingly, an encoder in accordance with aspects of the present invention may determine first parameter without comparing one entire still image with the entire previous still image. In this example, only macro block 1210 is compared with macro block 1204.

Returning to FIG. 11, it is then determined whether the difference between the determined first parameter $P_1$ is greater than or equal to a predetermined low threshold (S1106). In an example embodiment, the first parameter $P_1$ is a SAD and this determination is performed by low threshold comparing portion 904, a discussed above with reference to FIG. 9.

Returning to FIG. 11, if it is determined that the difference between the determined first parameter is less than the predetermined low threshold, the encoder will be triggered to encode the next frame with a low-level encoding scheme (S1008). For example, as illustrated in FIG. 6, still image 308 is not drastically different from still image 306. Therefore, the encoder will be triggered to encoded frame 410 with a low-level encoding scheme. In particular, while encoding encoded frame 408, the encoder will understand that a scene change not occurred. Therefore the very next frame will be encoded with the low-level encoding scheme.

If it is determined that the difference between the determined first parameter is greater than or equal to the predetermined low threshold (S1106), a second parameter is determined (S1110). In an example embodiment a value $P_2$, which is the difference between an average motion vector an entire current still image and an average motion vector of an entire immediately previous still image, is determined. In some embodiments, only a portion of one still image is compared with a portion of the immediately preceding still image, as discussed above with reference to FIGS. 12A and B. The second parameter may be determined by high threshold comparing portion 906. Accordingly, the second parameter may not be need to be determined if low threshold comparing portion 904 determines that the next frame should be encoded with a low-level encoding scheme, i.e., low threshold comparison value 910 may be a 1.

It is then determined whether the difference between the determined second parameter is greater than or equal to a predetermined high threshold (S1112). This determination is performed by high threshold comparing portion 906, a discussed above with reference to FIG. 9.

If it is determined that the difference between the determined second parameter is greater than or equal to the predetermined high threshold, the encoder will be triggered to encode the next frame with a high-level encoding scheme (S1114). For example, as illustrated in FIG. 6, still image 320 is drastically different from still image 318 (see FIG. 2C). Therefore, the encoder will be triggered to encoded frame 422 with a high-level encoding scheme, wherein encoded frame 422 is based still image 322. In particular, while encoding encoded frame 420, the encoder will understand that a scene change has occurred. Therefore the very next frame will be encoded with the high-level encoding scheme.

If it is determined that the difference between the determined second parameter is less than the predetermined high threshold, the encoder will be triggered to encode the next frame with a second low-level encoding scheme (S1116). For example, as illustrated in FIG. 6, still image 312 is different from still image 310 (see FIG. 2B). Therefore, the encoder will be triggered to encoded frame 602 with a second low-level encoding scheme, wherein encoded frame 602 is based on a difference between still image 314 and still image 310. In particular, while encoding encoded frame 412, the encoder will understand that a luminance variation has occurred. Therefore the very next frame will be encoded with the second low-level encoding scheme.

However, the encoder is triggered (any one of S1108, S1114 or S1116), method 1100 then stops (S1118).

Method 1000 and method 1100, discussed above with reference to FIGS. 10 and 11, respectively, generally describe aspects of the present invention.

A more specific example of the operation of a video encoding system in accordance with the present invention will now be describe with reference to FIGS. 6, 8, 9, 12 and 13.

Figure 13:
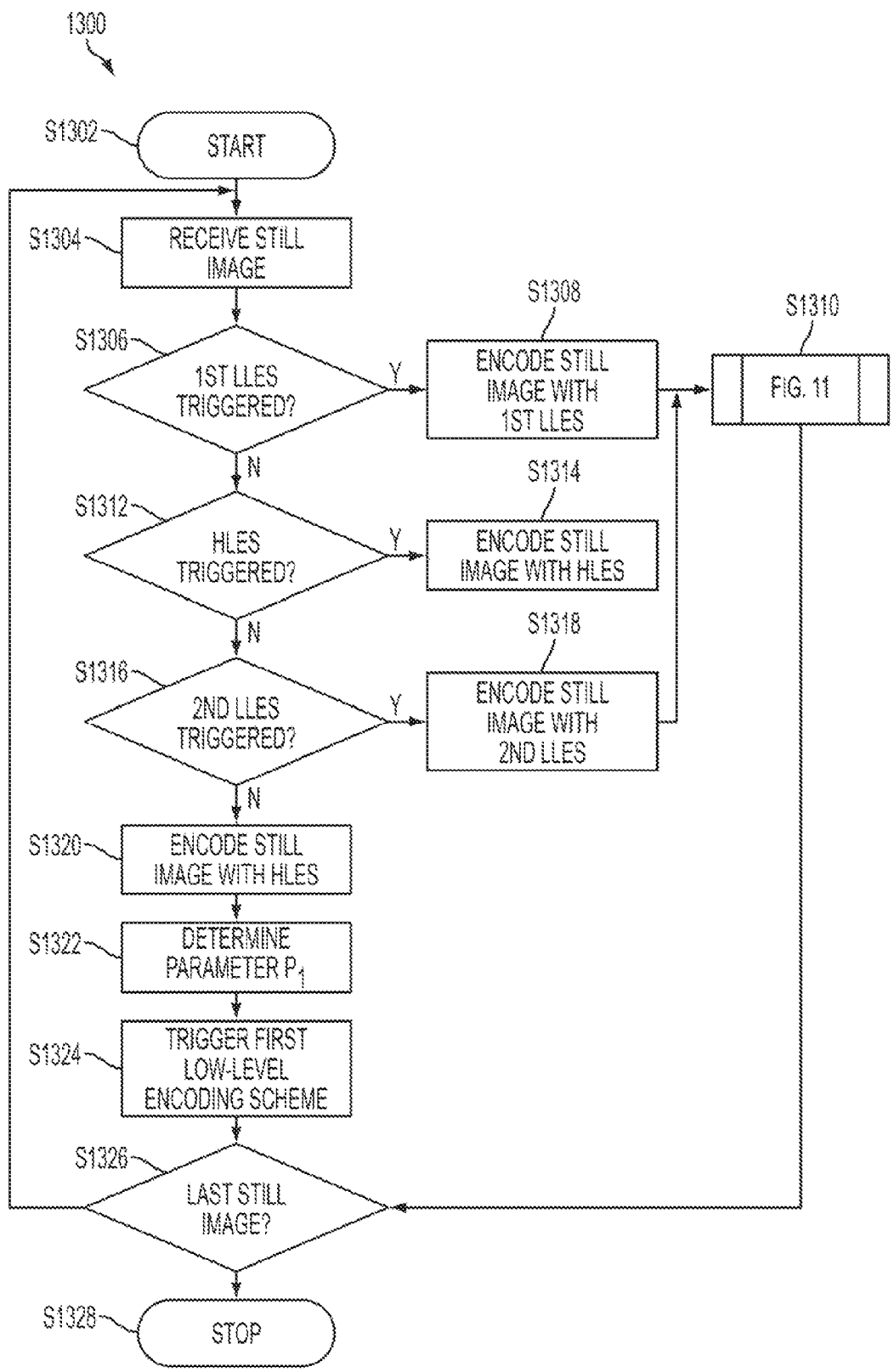
FIG. 13 illustrates an example method of encoding video data in accordance with aspects of the present invention.

FIG. 13 illustrates an example method 1300 of encoding video data in accordance with aspects of the present invention.

Method 1300 takes into account the fact that a first still image will be encoded as an encoded frame with a high-level encoding scheme because there is no previous still image with which to compare. Method 1300 additionally takes into account the fact that a second still image will be encoded as an encoded frame with: a high-level encoding scheme when there is sufficient movement as compared to the first still image; or a first low-level encoding scheme because there is still image previous to the first still image with which to compare. These issues will be described in more detail below.

Method 1300 starts (S1302) and a still image is received (S1304). For example, returning to FIGS. 6 and 8, video encoder 800 receives first still image 302, which corresponds to FIG. 2A.

It is then determined whether the encoder is triggered to encode the received still image with the first low-level encoding scheme (S1306). If after the preceding still image was encoded and the encoder was triggered, for example in S1108 of FIG. 11, then the encoder will be triggered to encode the current still image with the first low-level encoding scheme. If after the preceding still image was encoded and the encoder was triggered, for example in either one of S1114 or S1116 of FIG. 11, then the encoder will not be triggered to encode the current still image with the first low-level encoding scheme. Clearly if the current still image is the first still image, then there will have been no previously encoded still image. In such a case, the encoder will not be triggered to encode the current still image with the first low-level encoding scheme.

If it is determined that the encoder is triggered to encode the received still image with the first low-level encoding scheme, then the current still image is encoded with the first low-level encoding scheme (S1308). This is discussed above with reference to still image 304 of FIG. 6.

Then the encoder is triggered to encode the following still image in accordance with method 1100 of FIG. 11 (S1310).

If it is determined that the encoder is not triggered to encode the received still image with the first low-level encoding scheme (S1306), it is determined whether the encoder is triggered to encode the received still image with the high-level encoding scheme (S1312). If after the preceding still image was encoded and the encoder was triggered, for example in S1114 of FIG. 11, then the encoder will be triggered to encode the current still image with the high-level encoding scheme. If after the preceding still image was encoded and the encoder was triggered, for example in either one of S1108 or S1116 of FIG. 11, then the encoder will not be triggered to encode the current still image with the high-level encoding scheme. Clearly if the current still image is the first still image, then there will have been no previously encoded still image. Nevertheless, as will be discussed below, in such a case, the encoder will be triggered to encode the current still image with the high-level encoding scheme.

If it is determined that the encoder is triggered to encode the received still image with the high-level encoding scheme, then the current still image is encoded with the high-level encoding scheme (S1314). This is discussed above with reference to still image 320 of FIG. 6.

Then the encoder is triggered to encode the following still image in accordance with method 1100 of FIG. 11 (S1310).

If it is determined that the encoder is not triggered to encode the received still image with the high-level encoding scheme (S1312), it is determined whether the encoder is triggered to encode the received still image with the second low-level encoding scheme (S1316). If after the preceding still image was encoded and the encoder was triggered, for example in S1116 of FIG. 11, then the encoder will be triggered to encode the current still image with the second low-level encoding scheme. If after the preceding still image was encoded and the encoder was triggered, for example in either one of S1108 or S1114 of FIG. 11, then the encoder will not be triggered to encode the current still image with the second low-level encoding scheme. Clearly if the current still image is the first still image, then there will have been no previously encoded still image. Therefore, in such a case, the encoder will not be triggered to encode the current still image with the second low-level encoding scheme.

If it is determined that the encoder is triggered to encode the received still image with the second low-level encoding scheme, then the current still image is encoded with the second low-level encoding scheme (S1318). This is discussed above with reference to still image 314 of FIG. 6.

Then the encoder is triggered to encode the following still image in accordance with method 1100 of FIG. 11 (S1310).

If it is determined that the encoder is not triggered to encode the received still image with the second low-level encoding scheme (S1316), then the current still image is encoded with the high-level encoding scheme (S1320). This is discussed above with reference to still image 302 of FIG. 6. In particular, in this situation, the encoder was not triggered at all. Therefore, the received still image must have been the first still image.

Then a first parameter is determined (S1322). This is discussed above with reference to S1104 of FIG. 11.

Then the encoder is triggered to encode the following still image with the first low-level encoding scheme (S1324). Again, in this situation, the current frame is the first frame, so the second frame will be encoded with the first low-level encoding scheme. In particular, the encoder will not be able to encode the following still image with the second low-level encoding scheme, because there is no still image (that is previous to the current first still image) with which to compare.

It is then determined whether the current still image is the last still image (S1326). This determination may be made in any known manner, non-limiting examples of which include identification, such as an ending image identification, within the data of the still image.

If it is determined that the current still image is not the last still image, the next still image is then received (S1304). Otherwise, method 1300 stops (S1328).

In accordance with an aspect of the present invention, if the current still image is not the first still image but there is a scene change as determined by comparing the current still image with the immediately preceding still image, then the current still image is encoded with a high-level encoding scheme and a following still image is encoded with a high-level encoding scheme if a scene change is detected. An encoded frame that has encoded with the high-level encoding scheme will require a relatively large amount of processing resources down the line.

In accordance with another aspect of the present invention: if the current still image is not the first stilt image; if the current still image is not the second still image; and if there is little change between a detected parameter of the current still image and the detected parameter of the immediately preceding still image, then the current still image is encoded with a second low-level encoding scheme and a following still image is encoded with a high-level encoding scheme if a scene change is detected. An encoded frame that has encoded with the second low-level encoding scheme will be based on the current still image and the immediately preceding still image and will require less processing resources down the line than a frame that has been encoded with the high-level encoding scheme.

In accordance with another aspect of the present invention: if the current still image is not the first still image; if the current still image is not the second still image; if there is not a large change between a detected parameter of the current still image and the detected parameter of the immediately preceding still image; and there is a sufficient change between a detected parameter of the current still image and the detected parameter of the immediately preceding still image, then the current still image is encoded with a first low-level encoding scheme and a following still image is encoded with a high-level encoding scheme if a scene change is detected. An encoded frame that has encoded with the first low-level encoding scheme will be based on the current still image and the second preceding still image and will require less processing resources down the line than a frame that has been encoded with the high-level encoding scheme.

Figure 2B:
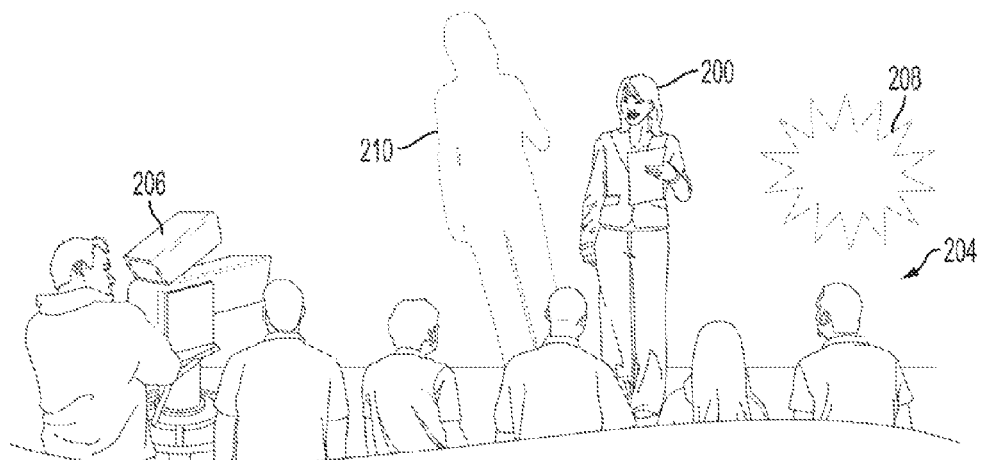
Figure 2C:
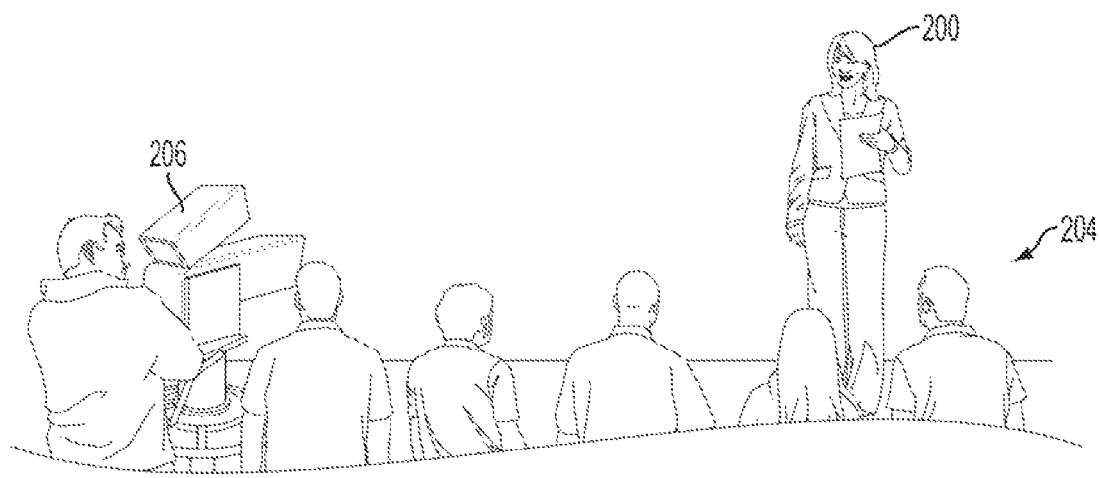
Figure 4:
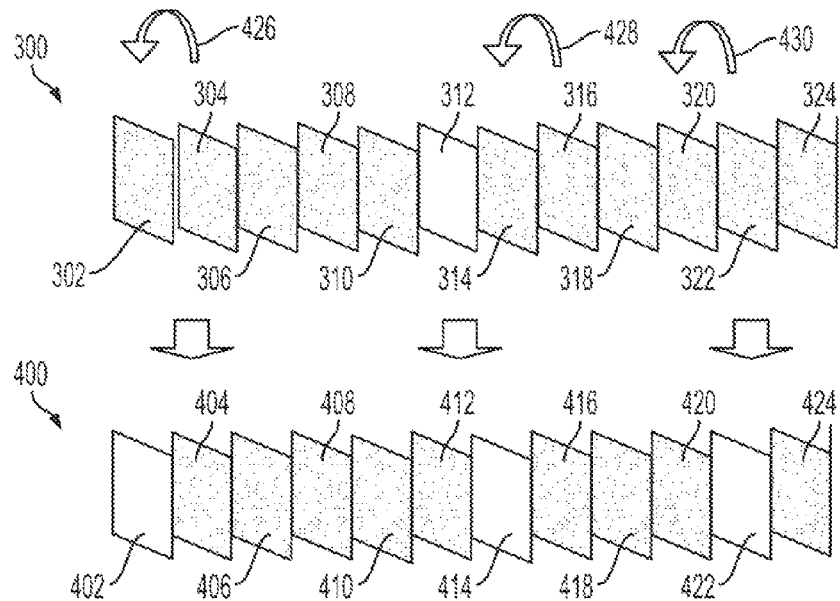
FIG. 4 illustrates a group of encoded frames that have been encoded with a conventional encoding scheme and that correspond to the group of still images of FIG. 3.

With conventional video encoding systems and methods, when a still image having a drastic change is luminance (for example from a flash photograph) is encoded, the following frame is encoded with a high-level encoding scheme. For example, as discussed above with reference to FIG. 4, still image 312 includes a dramatic luminance increase as a result of flash 208 (FIG. 2B). Accordingly, with the conventional encoding method and system, encoded frame 414 is encoded with a high-level encoding scheme. This high-level encoding scheme requires a larger amount of processing resources to generate, store, transmit and decode encoded frame 414. As discussed above with reference to FIG. 5, with another conventional encoding method and system, frame 502 is encoded with a low-level encoding scheme that requires a comparison of still image 314 with a plurality of preceding still images. This low-level encoding scheme requires less processing resources to store, transmit and decode encoded frame 502 than the high-level encoding scheme discussed with reference to FIG. 4. However, the low-level encoding scheme used for encoding frame 502 requires larger processing power and memory space. This will avoid usage of multiple reference frame scheme in mobile platforms where there is limitation on processing power and memory space.

With a video encoding system and method in accordance with aspects of the present invention, a still image may be encoded with a first low-level encoding scheme unless a difference between the still image and an immediately preceding still image is above a lower threshold, $P_{TL}$. Further, a still image may be encoded with a high-level encoding scheme if the difference between the still image and the immediately preceding still image greater than or equal to a high threshold, $P_{TH}$. Finally, a still image may be encoded with a second low-level encoding scheme if the difference between the still image and the immediately preceding still image greater than or equal to the low threshold $P_{TL}$, but is less than the high threshold, $P_{TH}$. This second low-level encoding scheme requires less processing resources to generate, store, transmit and decode encoded frame 602 than the low-level encoding scheme discussed with reference to FIG. 5 because encoded frame 602 is based on a comparison of a still image 314 with a single other still image, i.e., the second preceding still image 310.

A benefit of a video encoding system and method in accordance with aspects of the present invention is evident during instances of drastic variation in luminance. For example, as discussed above with reference to FIG. 2B, a video encoding system and method in accordance with aspects of the present invention will avoid encoding a still image after a flash with a high-level encoding scheme. Further, as compared with the conventional system and method discussed above with reference to FIG. 5, a video encoding system and method in accordance with aspects of the present invention is able to encode the still image after a flash by only comparing the current still image with a single preceding still image. This reduces the processing resources when generating the encoded frame.

In accordance with another aspect of the present invention, a high-level encoding scheme is triggered, not only for a first still image and for a still image with a drastic change, but also in regular predefined intervals decided by an encoder configuration. An encoding system or method in accordance with the present invention can be used in constant bit rate applications more efficiently.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A video encoder for use with first still image data, second still image data and third still image data, said video encoder comprising:
   a determining portion operable to output a determining signal based on the second still image data and the third still image data; and
   a frame generating portion operable to output an encoded signal having first frame data, second frame data and third frame data, the first frame data being based on the first still image data, the third frame data being based on the first still image data and the third still image data when the determining signal is less than a predetermined threshold, the third frame data not being based on the first still image data when the determining signal is equal to or greater than the predetermined threshold, wherein said determining portion comprises:
   a parameter detecting portion operable to generate a first detected parameter value based on a first portion of the second still image data;
   a low threshold comparing portion operable to generate a low threshold comparison value based on the first detected parameter value, the low threshold comparison value having a first binary state when the first detected parameter value is greater than or equal to a predetermined low threshold, the low threshold comparison value having a second binary state when the first detected parameter value is less than the predetermined low threshold; and
   a high threshold comparing portion operable to generate a second detected parameter value and a high threshold comparison value, the second detected parameter value being based on a first portion of the second still image data, the high threshold comparison value being based on the second detected parameter value, the high threshold comparison value having a first binary state when the second detected parameter value is greater than a predetermined high threshold, the high threshold comparison value having a second binary state when the second detected parameter value is less than or equal to the predetermined high threshold,
   wherein said frame generating portion is operable to output the encoded signal having first frame data, second frame data and third frame data, such that the third frame data is based on the first still image data and the third still image data when the high threshold comparison value is in a second binary state and when the low threshold comparison value is in the first binary state, and
   wherein said frame generating portion is operable to output the encoded signal having first frame data, second frame data and third frame data, such that the third frame data is not based on the first still image data when the low threshold comparison value is in the second binary state.

2. The video encoder of claim 1, wherein said parameter detecting portion is operable to generate the first detected parameter value as the sum of the absolute difference between the first portion of the second still image and the first portion of the first still image.

3. The video encoder of claim 2, wherein said parameter detecting portion is operable to generate the first detected parameter value as the sum of the absolute difference between the entire second still image and the entire first still image.

4. The video encoder of claim 3, wherein said high threshold comparing portion is operable to generate the second detected parameter value as an average motion vector for the entire second still image.

5. A method of encoding first still image data, second still image data and third still image data, said method comprising:
   outputting, via a determining portion, a determining signal based on the second still image data and the third still image data; and
   outputting, via a frame generating portion, an encoded signal having first frame data, second frame data and third frame data, the first frame data being based on the first still image data, the third frame data being based on the first still image data and the third still image data when the determining signal is less than a predetermined threshold, the third frame data not being based on the first still image data when the determining signal is equal to or greater than the predetermined threshold, wherein said outputting a determining signal comprises:

generating, via a parameter detecting portion, a first detected parameter value based on a first portion of the second still image data;

generating, via a low threshold comparing portion, a low threshold comparison value based on the first detected parameter value, the low threshold comparison value having a first binary state when the first detected parameter value is greater than or equal to a predetermined low threshold, the low threshold comparison value having a second binary state when the first detected parameter value is less than the predetermined low threshold;

generating, via a high threshold comparing portion, a second detected parameter value based on a first portion of the second still image data; and generating, via the high threshold comparing portion, a high threshold comparison value based on the second detected parameter value, the high threshold comparison value having a first binary state when the second detected parameter value is greater than a predetermined high threshold, the high threshold comparison value having a second binary state when the second detected parameter value is less than or equal to the predetermined high threshold, wherein said outputting, via a frame generating portion, an encoded signal having first frame data, second frame data and third frame data comprises outputting the encoded signal having first frame data, second frame data and third frame data, such that the third frame data is based on the first still image data and the third still image data when the high threshold comparison value is in a second binary state and when the low threshold comparison value is in the first binary state, and wherein said outputting, via a frame generating portion, an encoded signal having first frame data, second frame data and third frame data comprises outputting the encoded signal having first frame data, second frame data and third frame data, such that the third frame data is not based on the first still image data when the low threshold comparison value is in the second binary state.

6. The method of claim 5, wherein said generating, via a parameter detecting portion, a first detected parameter value based on a first portion of the second still image data comprises generating the first detected parameter value as the sum of the absolute difference between the first portion of the second still image and the first portion of the first still image.

7. The method of claim 6, wherein said generating the first detected parameter value as the sum of the absolute difference between the first portion of the second still image and the first portion of the first still image comprises generating the first detected parameter value as the sum of the absolute difference between the entire second still image and the entire first still image.

8. The method of claim 7, wherein said generating, via a high threshold comparing portion, a second detected parameter value based on a first portion of the second still image data comprises generating the second detected parameter value as an average motion vector for the entire second still image.

9. A non-transitory computer-readable medium having computer-readable instructions stored thereon, the computer-readable instructions being capable of instructing a computer to perform a method of encoding first still image data, second still image data and third still image data, said method comprising:

outputting, via a determining portion, a determining signal based on the second still image data and the third still image data; and outputting, via a frame generating portion, an encoded signal having first frame data, second frame data and third frame data, the first frame data being based on the first still image data, the third frame data being based on the first still image data and the third still image data when the determining signal is less than a predetermined threshold, the third frame data not being based on the first still image data when the determining signal is equal to or greater than the predetermined threshold, wherein the computer-readable instructions capable of instructing the computer to perform outputting a determining signal comprises computer-readable instructions capable of instructing the computer to perform:

generating, via a parameter detecting portion, a detected parameter value based on a first portion of the second still image data;

generating, via a low threshold comparing portion, a low threshold comparison value based on the detected parameter value, the low threshold comparison value having a first binary state when the detected parameter value is greater than or equal to a predetermined low threshold, the low threshold comparison value having a second binary state when the detected parameter value is less than the predetermined low threshold; and generating, via a high threshold comparing portion, a high threshold comparison value based on the detected parameter value, the high threshold comparison value having a first binary state when the detected parameter value is greater than a predetermined high threshold, the high threshold comparison value having a second binary state when the detected parameter value is less than or equal to the predetermined high threshold, wherein said outputting, via a frame generating portion, an encoded signal having first frame data, second frame data and third frame data comprises outputting the encoded signal having first frame data, second frame data and third frame data, such that the third frame data is based on the first still image data and the third still image data when the high threshold comparison value is in a second binary state and when the low threshold comparison value is in the first binary state, and wherein said outputting, via a frame generating portion, an encoded signal having first frame data, second frame data and third frame data comprises outputting the encoded signal having first frame data, second frame data and third frame data, such that the third frame data is not based on the first still image data when the low threshold comparison value is in the second binary state.

10. The non-transitory computer-readable medium of claim 9, wherein the computer-readable instructions capable of instructing the computer to perform said generating, via a parameter detecting portion, a first detected parameter value based on a first portion of the second still image data comprise computer-readable instructions capable of instructing the computer to perform generating the first detected parameter value as the sum of the absolute difference between the first portion of the second still image and the first portion of the first still image.

11. The non-transitory computer-readable medium of claim 10, wherein the computer-readable instructions capable of instructing the computer to perform said generating the first detected parameter value as the sum of the absolute difference between the first portion of the second still image and the first portion of the first still image comprise computer-readable instructions capable of instructing the computer to perform generating the first detected parameter value as the sum of the absolute difference between the entire second still image and the entire first still image.

12. The non-transitory computer-readable medium of claim 11, wherein the computer-readable instructions capable of instructing the computer to perform said generating, via a high threshold comparing portion, a second detected parameter value based on a first portion of the second still image data comprise computer-readable instructions capable of instructing the computer to perform generating the second detected parameter value as an average motion vector for the entire second still image.

* * * * *